United States Patent
Pater et al.

(10) Patent No.: US 8,367,144 B2
(45) Date of Patent: Feb. 5, 2013

(54) PET'S CHEW

(75) Inventors: Willem Theodoor Martinus Pater, Winschoten (NL); Richard Volk, Wildervank (NL); Geraldus Gerardus Johannes Schennink, Wehl (NL)

(73) Assignee: Paragon Products B.V., Veendam (NL)

( * ) Notice: Subject to any disclaimer, the term of this patent is extended or adjusted under 35 U.S.C. 154(b) by 0 days.

(21) Appl. No.: 10/418,327

(22) Filed: Apr. 16, 2003

(65) Prior Publication Data

US 2003/0219516 A1    Nov. 27, 2003

Related U.S. Application Data

(60) Provisional application No. 60/373,775, filed on Apr. 19, 2002.

(30) Foreign Application Priority Data

Apr. 19, 2002 (EP) ..................... 02076595

(51) Int. Cl.
*A23K 1/18* (2006.01)

(52) U.S. Cl. ........ 426/635; 426/630; 426/658; 426/512; 426/661; 426/805; 426/623

(58) Field of Classification Search .......... 426/623, 426/630, 635, 518, 805, 656, 661, 512
See application file for complete search history.

(56) References Cited

U.S. PATENT DOCUMENTS

| | | | |
|---|---|---|---|
| 3,137,592 A * | 6/1964 | Protzman et al. | 127/71 |
| 5,286,770 A | 2/1994 | Bastioli et al. | |
| 5,405,564 A * | 4/1995 | Stepto et al. | 264/115 |
| 5,407,661 A * | 4/1995 | Simone et al. | 424/49 |
| 6,001,385 A * | 12/1999 | Van De Wijdeven | 424/422 |
| 6,086,940 A | 7/2000 | Axelrod | 426/623 |
| 6,126,978 A * | 10/2000 | Axelrod | 426/285 |
| 6,159,516 A * | 12/2000 | Axelrod et al. | 426/456 |
| 6,200,616 B1 * | 3/2001 | Axelrod et al. | 426/285 |
| 6,379,725 B1 * | 4/2002 | Wang et al. | 426/72 |
| 6,672,252 B2 * | 1/2004 | Levin et al. | 119/709 |

FOREIGN PATENT DOCUMENTS

| | | |
|---|---|---|
| DE | 19830775 A1 | 1/2000 |
| EP | 551954 A2 * | 7/1993 |
| EP | 0552897 A1 | 7/1993 |
| EP | 0838153 A1 | 4/1998 |
| EP | 1018519 A2 | 7/2000 |
| JP | 11-56261 | 3/1999 |
| WO | WO 99/56556 | 11/1999 |
| WO | WO 01/45517 A1 | 6/2001 |

\* cited by examiner

*Primary Examiner* — Chhaya Sayala
(74) *Attorney, Agent, or Firm* — Hoffmann & Baron, LLP

(57) ABSTRACT

The invention relates to a pet's chew prepared from natural materials of renewable sources. The chew is both edible and biodegradable, and furthermore has excellent mechanical properties giving it a long lasting time, even if used for strong animals such as large dogs.

27 Claims, No Drawings

PET'S CHEW

This application asserts the priority of U.S. Provisional Application Ser. No. 60/373,775 and European Patent Application No.: EP02076595.4, both filed on Apr. 19, 2002. The specification of U.S. Provisional Application Ser. No. 60/373,775 and European Patent Application No. EP02076595.4 are hereby incorporated by reference.

BACKGROUND OF THE INVENTION

The invention relates to a process for producing a pet's chew and to a pet's chew obtainable by said process.

Chewable articles for pets such as dogs are well known in the art. These articles are of a flexible nature and serve as a toy for the pet as well as a means of keeping the pet's dentures in good condition. This type of article can be manufactured of different materials. Mainly, they can be divided in two classes: a non-edible variant and an edible variant.

The non-edible variant of a pet's chew can be made from synthetic plastic materials or from raw hide. They have good chewing qualities and, due to their mechanical properties, they have a fairly long lasting time. The greatest disadvantage of most of the non-edible chews is that they are hardly biodegradable, if at all.

Edible pet's chews are mostly produced from raw materials such as cereals, rice, milk and products derived therefrom such as casein, gelatin, and starches. Typically, they comprise numerous additives such as gums, meat or other products of animal origin, mineral oils or fats, vitamins, coloring agents, aromas or taste enhancers. The aim is, of course, to produce a coherent product having the desired mechanical properties to last a long time.

U.S. Pat. No. 5,827,565 discloses a dog chew based on a thermoplastic starch, PARAGON IM 1010. This thermoplastic starch comprises a fairly large amount of calcium carbonate. The dog chew has a brittle character and is therefore less suitable for large dogs.

A disadvantage of most known edible chews is that their mechanical properties are not satisfactory. Due to the fact that they comprise a mixture of several ingredients, they are often brittle and often fall apart soon after a pet, such as a large dog, has set its teeth in it.

The present invention aims to provide a pet's chew prepared from natural materials of renewable sources, making the chew both edible and biodegradable. It is specifically desired that the chew has excellent mechanical properties giving it a long lasting time, even if used for strong animals such as large dogs.

SUMMARY OF THE INVENTION

It has been found that an excellent pet's chew can be produced from thermoplastic starch by incorporating relatively large amounts of plasticizer and fibers. Accordingly, the invention relates to a process for preparing a pet's chew comprising
preparing a mixture of a starch or a starch derivative, a plasticizer and a fibrous material;
converting said mixture into a thermoplastic starch; and
molding the thermoplastic starch into the desired pet's chew.

Due to the nature of the raw material on which a pet's chew according to the invention is based, starch, it is a biodegradable, edible product to which no risks associated with for instance BSE or Salmonella are associated. Furthermore, the specific composition of starting materials and the method of producing the chew makes that it has excellent mechanical properties. It is both tough and flexible, and has a long lasting time. It is a product which, in its mechanical properties, closely resembles known chews based on synthetic materials, while it is nevertheless edible and biodegradable. Due to its advantageous mechanical properties, a chew according to the invention has a beneficial effect on the dentures of a pet.

DETAILED DESCRIPTION OF THE INVENTION

As mentioned, a pet's chew according to the invention is based on starch. In principle, the starch way be of any origin. Suitable examples are potato, wheat, corn, tapioca, rice and pea starches. It is preferred to use a wheat starch as this has been found to lead to a final product have a very good dimensional stability. The starch can be used in native form, but may also be physically or chemically modified. Of course, it is also possible to use combinations of native starch and modified starch, or combinations of different modified starches. Chemically modified starches which may be used are oxidized starches, carboxymethylated starches, hydroxyalkylated starches, acetylated starches, (partially) hydrolysed starches, and other derivatized starches. An example of a suitable physically modified starch is a starch which has been subjected to ion exchange with, for instance, sodium or potassium ions.

The mixture that is to be converted into a thermoplastic starch according to the invention preferably comprises an amount of starch from 15 to 90 wt. %, preferably from 50 to 80 wt. %, based on dry solid weight of the mixture.

A preferred example of a modified starch is a starch hydrolysate. This is a native (or already otherwise modified) starch which has been subjected to a partial chemical or enzymatic hydrolysis. The extent of hydrolysis can be expressed in terms of the dextrose equivalent (DE). Starch which has not been subjected to hydrolysis has a DE of 0, whereas a completely hydrolysed starch has a DE of 100. In order to improve the flowing characteristics of a mixture from which a thermoplastic starch is prepared according to the invention, it is preferred to incorporate a starch hydrolysate having a DE up to 40, more preferably between 1 and 20. It has been found that the use of a partially modified starch in the preparation of a pet's chew according to the invention results in a product having superior characteristics. The mobility or viscosity of the mixture to be converted into a thermoplastic starch is increased, leading to an improved relaxation of the stress present in the material. As a result an increased dimensional stability in conjunction with an improved flexibility are achieved.

If desired, the starch may be mixed with other natural and biodegradable polymers such as cellulose and derivatives thereof, proteins such as zein or wheat proteins, or other polysaccharides such as gums (Arabic gum, guar gum and the like), pectin, or dragant. It is also possible to use a natural mixture of starch and proteins, such as flour, as a starting material.

In order to prepare a pet's chew of a starch material according to the invention, the starch is first converted into a thermoplastic starch. To that end, a mixture of the starch with suitable additives is prepared, which mixture is then subjected to extrusion.

An important aspect of the invention is that the starch is mixed with a plasticizer. Although water also has plasticizing qualities in a process of producing a pet's chew according to the invention, an additional plasticizer is required. A preferred class of plasticizers is the class of polyols. This class comprises, amongst others, glycol, diethylene glycol, alkylene glycols, polyalkylene glycol, sorbitol, glycerol, glycerol mono-esters, and the like. Other suitable classes of plasticizers include esters of citric acid, and urea.

The amount of water that is preferably present in the starting mixture to prepare a pet's chew according to the invention from is from 7 to 35 wt. %, based on dry solid weight of the mixture. In addition to that, 5 to 30 wt. %, preferably 15 to 30 wt. %, and more preferably 18 to 30 wt. %, based on dry solid weight of the mixture, of the additional plasticizer is used. It has been found that these amounts of plasticizer lead to a very flexible product, while the dimensional stability of the final product, the pet's chew, is not endangered.

The mixture may further comprise other additives such as an emulsifier. Suitable examples of emulsifiers include lecithin and monoglycerides. An emulsifier will be preferably be present in an amount of from 0 to 5 wt. %, based on dry solid weight of the mixture.

Flow property enhancers/lubricants result in an increased processability (products with lower stress) of the thermoplastic starch. Examples of flow property enhancers are animal and vegetable oils and fats, especially hydrogenated oils and fats, and fatty acids and fatty acid derivatives such as mono- and diglycerides, fatty acid amides, metal salts and sorbitanesters of these fatty acids. Also fosfatides can be used as flow property enhancer. Ricinus oil and lecithin are examples of flow property enhancers/lubricants with a particular good performance. The amount of flow property enhancer in the mixture to be converted to a thermoplastic starch can be up to 10%, more preferably between 0 and 5 wt. % based on dry solid weight.

Another important ingredient in the mixture is a fiber. Preferably, a pet food-grade fibrous material of natural origin is used. Preferred examples include cellulose, hemp, coconut, grass, flax, potato and other natural fibers. The fibers preferably have a length between 23 and 2000 µm, more preferably between 60 and 300 µm. The amount in which the fiber is preferably used is chosen in the range of from 1 to 35 wt. %, more preferably from 1 to 25 wt. %, and even more preferably 5 to 20 wt. %, based on the weight of dry solid mixture.

It is further possible to incorporate an organic or inorganic filler material, such as chalk or titanium oxide. A filler is preferably added in an amount of from 0 to 10 wt. %, based on the weight of dry solid mixture.

Other additives, such as pH regulators, health ingredients, coloring agents, enzymes, aromas or palatability enhancers can also be incorporated at this stage. For example, as pH regulator sodium bicarbonate or a phosphate buffer can be used. As health ingredients, vitamins or conjugated linolaic acid (CLA) can be used. As aroma or palatability enhancer, chicken, beef, or vegetable (e.g. mint or vanilla) aromas are often employed. As coloring agents, red, yellow, orange (iron oxide), green (chlorophyl) or white (titanium oxide) colorants are often employed. Typically, these additives will be added in an amount in the range of from 0 to 10 wt. %, based on dry solid weight of the mixture.

In order to prepare a thermoplastic starch of the above described mixture, it is subjected to an extrusion step. During the extrusion, the starch will be gelatinised. It is preferred to use a twin-type extruder operated at a temperature of from 95 to 180° C., more preferably from 100 to 150° C. As the mixture will undergo a thorough homogenisation during extrusion, it is not of crucial importance that all ingredients of the mixture are mixed so rigorously as to obtain a homogeneous mixture prior to extrusion. During the extrusion, the starch will be converted from a ordered structure into an unordered, amorphous structure (destructurizing), which yields a thermoplastic, very well processable material.

In one embodiment, the pet's chew is molded in an extrusion step. In principle, it is possible that this is done in the same extrusion step as described above for obtaining the thermoplastic starch. However, it is preferred that a second extrusion step is performed. In that case, the second extrusion step is preferably carried out using a single-screw type extruder. Between the first and second extrusion steps, the thermoplastic material may be pressed through a mesh having a pore size of from 1 to 5 mm and cut to obtain a granulate material. This granulate material is preferably conditioned to an appropriate moisture content for the second extrusion step, which moisture content will generally be lower than that during the first extrusion step.

It is one of the advantages of the invention that the thermoplastic material that is formed in the extruder is sufficiently plastic in character to be pressed through a die. Under atmospheric conditions, the extruded product does not need to be foamed. The material that exits the extruder is either cut directly at the die opening to the desired size and shape, or is first cooled using forced air or nitrogen cooling and then cut to the desired size and shape. It is preferred that the material is not water cooled.

In another embodiment, the pet's chew is molded by injection molding. In accordance with this embodiment, it is preferred that the destructurized starch mixture is pressed through a mesh having a pore size of from 1 to 5 mm after extrusion, or preferably as a last step of the extrusion process. This will typically be done if the pet's chew is to be molded by injection molding. The obtained fibrous material is preferably cut to obtain a granulate material. This granulate material is preferably conditioned to a moisture content of from 5 to 20 wt. %, more preferably from 6 to 15 wt. %, even more preferably from 7 to 10 wt. %, based on the weight of the granulate material. The moisture content can be controlled by using a vacuum zone in the extruder or by drying the granulate with hot air.

During injection molding, it is preferred to employ a processing temperature ranging from 80 to 200° C., more preferably from 110 to 170° C. If no, or not all additives like vitamins, coloring agents, aromas or taste enhancers have been added prior to extrusion, they can also be added to the thermoplastic starch granulate directly prior to injection molding.

The injection molding is preferably performed using a pressure in the barrel of the apparatus of below 1500 bar. The rate of injection is preferably kept relatively low and the injection channels are preferably relatively wide in order to keep the shear, that the material is exposed to low.

Modification of the injection molding process may lead to an improved dimensional stability of the ultimate product. In order to achieve this, the process should be designed in such a way that the lowest amount of stresses is frozen in the matrix. This can be realised by increasing the processing temperature, low backpressure profiles and high mold temperatures, in combination with a low injection speed. As a result cycle times will increase. Therefore the use of a carrousel machine may be beneficial.

The mold into which the granulate material is injection molded, or the shape into which the material is cut after extrusion, preferably has the shape of a dog chew, such as the form of a bar, or a hollow or other natural shape, for instance mimicking the shape of a bone. Other shapes that are contemplated are of a marrow bone, pig's ear, tooth brush, or a combination of shapes such as a dog chew which is shaped like a bone on one side and like a tooth brush on the other. The final product is preferably packaged in a water, moisture and air proof packaging material.

It is to be noted that it is contemplated that the above described two embodiments of extrusion and injection molding can be combined, for instance by making use of a twin-screw extruder mounted on an injection molding device. In accordance with such a combined embodiment, the extruded product is introduced into the injection molding chamber without intermediate production of granulate material.

The invention will now be further elucidated by the following, non-restrictive examples.

EXAMPLE 1

120 parts by weight of food grade potato starch (moisture content 18%, obtained from AVEBE, Veendam, The Netherlands), X parts glycerol (for amounts, see table; type 1.26 wet, obtained from Chemproha), 3 parts by weight of lecithin (Topcitin 50 obtained from Lucas Meyer) and 27.5 parts by weight of cellulose fiber (type Arbocell BWW 40; average length of the fibre 200 µm; obtained from Rettenmaier) were mixed together. The amount of glycerol in the mixture was varied between 22.5 and 37.5 parts by weight.

The mixture was extruded in a Clextral BC 45 (L/D=23) extruder. The temperature profile was: 20 (feeding zone) 115/120/115/85 (die) ° C. The extrudate was granulated (pellet dimensions were about ø 4 mm) and dried to a moisture content of 9-10%. The granulate was injection moulded using an injection moulding apparatus Demag D60 NCIII-K, equipped with a standard PE-screw. Processing temperature was 150-160° C.; the mould temperature was 20° C. Sample bars were moulded according to DIN 23167.

The sample bars were conditioned for 7 days at 20° C. and 55% relative humidity. For determination of mechanical properties, a Zwick Z 010 tensile tester with strain transducers was used. The shrinkage properties in the injection moulding direction were determined by comparing the length of the bars before and after conditioning.

An overview of the experiments and the results is presented in Table 1 (samples 1, 2 and 3). An increasing amount of glycerol leads to a decreasing stiffness, and thus to an increased flexibility, and an increasing shrinkage.

EXAMPLE 2

120 parts by weight of food grade potato starch (moisture content 18%, obtained from AVEBE, Veendam, The Netherlands), 30 parts by weight of glycerol (type 1.26 wet, obtained from Chemproha), 3 parts by weight of lecithin (Topcitin 50 obtained from Lucas Meyer) and 28 parts by weight of cellulose fiber (type Arbocell obtained from Rettenmaier) were mixed together. The length of the cellulose fibers is varied between 23 and 2000 µm.

Using these mixtures, the procedure of Example 1 was repeated.

The results that were obtained are shown in Table 1 (see samples 4, 5, 6, and 7). It follows that an increasing fiber length has relatively little effect on the flexibility of the material. The dimensional stability increases significantly with increasing fiber length.

EXAMPLE 3

120 parts by weight of food grade potato starch (moisture content 18%, obtained from AVEBE, Veendam, The Netherlands), 30 parts by weight of glycerol (type 1.26 wet, obtained from Chemproha), 3 parts by weight of lecithin (Topcitin 50 obtained from Lucas Meyer) and cellulose fiber (type Arbocell BWW 40 obtained from Rettenmaier) were mixed together. The amount of cellulose fiber was varied between 20 and 35 parts by weight.

Using these mixtures, the procedure of Example 1 was repeated.

The results are shown in Table 1 (see samples 1, 8, and 9). An increasing amount of fibers leads to an increasing stiffness, and thus to a reduced flexibility. It also leads to an increasing dimensional stability.

EXAMPLE 4

100 parts by weight of dry, food grade starch, 30 parts by weight of glycerol (type 1.26 wet, obtained from Chemproha), 3 parts by weight of lecithin (Topcitin 50 obtained from Lucas Meyer) and 30 parts by dry solid weight of cellulose fiber (type Arbocell BWW 40 obtained from Rettenmaier) were mixed together. In this experiment, two types of starch were compared. These were food grade potato starch (as employed in the previous examples) and food grade wheat starch (type Excelsior, AVEBE, Veendam, The Netherlands).

Using these mixtures, the procedure of Example 1 was repeated.

The results are shown in Table 1 (see samples 1 and 10). With both starches, a comparable stiffness was attained. However, the dimensional stability of the samples based on wheat starch was significantly better.

EXAMPLE 5

116 parts by weight of food grade wheat starch (type Excelsior, moisture content 14%, obtained from Avebe, Veendam, The Netherlands), 33.2 parts by weight of glycerol (type 1.26 wet, obtained from Chemproha), 3 parts by weight of lecithin (Topcitin 50 obtained from Lucas Meyer) and 19 parts by dry solid weight of cellulose fiber (type Arbocell BWW 40 obtained from Rettenmaier) were mixed together. Except for the granulated extrudate, which was dried to a moisture content of 10-11%, the procedure of Example 1 was repeated using this mixture. The mechanical The results are shown in Table 1 (see samples 11 and 12, respectively 2 and 5 weeks conditioned). It follows that the mechanical properities after 5 weeks conditioning are the same as after 2 weeks conditioning. Thus, the flexibility of the material is maintained for periods shorter than 6 weeks.

TABLE 1

| Example | Sample # | Composition[1] | E-Modulus (Mpa) | Tensile strength (Mpa) | Strain at break (%) | Shrinkage (%) |
|---|---|---|---|---|---|---|
| I, | 1 | PN30G3L27.5BWW40 | 838 [31][2] | 10.9 [0.3] | 26.6 [1.9] | 3.5 |
| III, | 2 | PN22.5G3L27.5BWW40 | 1955 [46] | 21.6 [0.1] | 3.3 [0.2] | 1.2 |
| IV | 3 | PN37.5G3L27.5BWW40 | 106 [9] | 5.0 [0.1] | 46.4 [1.7] | 8.2 |
| II | 4 | PN30G3L28FIF400 | 1158 [52] | 15.5 [0.5] | 9.1 [1.5] | 1.0 |
|  | 5 | PN30G3L28B400 | 1109 [43] | 15.2 [0.4] | 13.0 [2.3] | 3.2 |

TABLE 1-continued

|     |    |                           |          |            |            |     |
| --- | -- | ------------------------- | -------- | ---------- | ---------- | --- |
|     | 6  | PN30G3L28BWW40            | 1111 [48]| 11.9 [0.2] | 22.4 [2.1] | 5.3 |
|     | 7  | PN30G3L28B600             | 1099 [53]| 11.1 [0.1] | 23.8 [1.6] | 6.3 |
| III | 8  | PN30G3L20BWW40            | 596 [61] | 9.5 [0.1]  | 32.6 [2.8] | 5.3 |
|     | 9  | PN30G3L35BWW40            | 1075 [51]| 13.1 [0.2] | 15.9 [2.6] | 2.4 |
| IV  | 10 | WN30G3L27.5BWW40          | 720 [56] | 10.9 [0.4] | 20.6 [2.0] | 2.4 |
| V   | 11 | WN33.2G3119BWW40 (2 weeks)| 164 [30] | 5.3 [0.1]  | 44.6 [4.1] | 5.3 |
|     | 12 | WN33.2G3119BWW40 (5 weeks)| 146 [5]  | 5.2 [0.1]  | 44.9 [1.7] | 5.9 |

[1]The composition can be read as follows:
- starch:
  - PN: potato starch
  - WN: wheat starch
- plasticizer: G: glycerol
- emulsifier: L: lecithin
- fiber:
  - BWW40: Arbocel BWW40 200 μm fiber
  - FIF400: Arbocel FIF400 2000 μm fiber
  - B400: Arbocel B400 900 μm fiber
  - B600: Arbocel B600 60 μm fiber

[2]Standard deviation of the measurements is given in bracket

The invention claimed is:

1. A process for preparing a pet chew comprising:
   a) preparing a starch-based mixture from a natural starch base, said starch-based mixture comprising:
      i) 50-80 wt. % of a starch component consisting of native starch or modified starch, or combinations thereof, based on dry solid weight of the mixture,
      ii) 18-30 wt. % of a plasticizer, based on dry solid weight of the mixture,
      iii) 5-20 wt. % of a fibrous material consisting of fibers, based on dry solid weight of the mixture, said fibers having a length of 60 to 300 μm, and
      iv) 7-35 wt. % of water, based on the weight of the mixture, and
   b) destructurizing the starch component of said mixture to form a thermoplastic starch-based material by subjecting the mixture to an extrusion step wherein the starch component is converted from an ordered structure to an unordered amorphous structure,
   wherein the pet chew is edible and biodegradable.

2. A process according to claim 1 further comprising
   c) pressing said thermoplastic starch-based material resulting from steps a) through b) through a mesh to produce and cut a granulate material.

3. A process according to claim 2 further comprising
   d) conducting a second extrusion step of said granulate material at a moisture content lower than the first extrusion step.

4. A process according to claim 3 further comprising
   e) molding the thermoplastic starch-based material or said granulate material into the desired pet chew.

5. A process according to claim 1, wherein said native starch or said modified starch is derived from one of potato, wheat, corn, tapioca, rice or pea.

6. A process according to claim 1, wherein the plasticizer is chosen from the group of polyols, esters of citric acid and urea.

7. A process according to claim 6, wherein the plasticizer is glycerol.

8. A process according to claim 1, wherein the fibrous material is chosen from the group of cellulose, hemp, coconut, grass, flax, potato and other natural fibers.

9. A process according to claim 1, wherein the modified starch is a starch hydrolysate.

10. A process according to claim 1, wherein the mixture further comprises one or more additives chosen from the group of lecithin, monoglycerides, oils, fats, fatty acids or salts thereof, filler materials, vitamins, coloring agents, aromas and taste enhancers.

11. A process according to claim 1, wherein the mixture is converted into a thermoplastic starch-based material by extrusion at a temperature of from 95 to 180° C.

12. A process according to claim 11, wherein the mixture is converted into a thermoplastic starch-based material by extrusion at a temperature of from 100 to 150° C.

13. A process according to claim 11, wherein, after extrusion, the thermoplastic starch-based material is pressed through a mesh having a pore size of from 1 to 5 mm and cut to produce a granulate material.

14. A process according to claim 13, further comprising conditioning the moisture content of the granulate material to 5 to 20 wt. %, based on the weight of the granulate material.

15. A process according to claim 1, wherein the thermoplastic starch-based material is molded by injection molding at a temperature ranging from 80 to 200° C., into a mold of suitable shape and size.

16. A process according to claim 15, wherein the thermoplastic starch-based material is molded by injection molding at a temperature ranging from 110 to 170° C., into a mold of suitable shape and size.

17. A process according to claim 16, wherein the thermoplastic starch-based material is molded by injection molding at a temperature ranging from 150 to 160° C., into a mold of suitable shape and size.

18. A process according to claim 10, wherein the fat is ricinus oil.

19. A process according to claim 10, wherein the fatty acid salt is calcium stearate.

20. A process according to claim 13, further comprising conditioning the moisture content of the granulate material to 6 to 15 wt. % based on the weight of the granulate material.

21. A process according to claim 20, further comprising conditioning the moisture content of the granulate material to 7 to 10 wt. % based on the weight of the granulate material.

22. A pet chew obtainable by a process comprising:
   a) preparing a starch-based mixture from a natural starch base, said starch-based mixture comprising:
      i) 50-80 wt. % of a starch component consisting of native starch or modified starch, or combinations thereof, based on dry solid weight of the mixture,
      ii) 18-30 wt. % of a plasticizer, based on dry solid weight of the mixture, iii) 5-20 wt. % of a fibrous material consisting of fibers, based on dry solid weight of the mixture, said fibers having a length of 60 to 300 μm, and iv) 7-35 wt. % of water, and b) destructurizing the starch component of said mixture to form a thermoplastic starch-based material by subjecting the mixture to an extrusion step wherein the starch component is converted from an ordered structure to an unordered amorphous structure, wherein the pet chew is edible and biodegradable.

23. A pet chew according to claim 22 having the form of a dog chew, bar or hollow or natural shape.

24. A process for preparing a pet chew comprising:

a) preparing a starch-based mixture from a natural starch base, said starch-based mixture comprising:

i) 55-80 wt. % of a starch component consisting of native starch or modified starch, or combinations thereof, based on dry solid weight of the mixture, ii) 18-30 wt. % of a plasticizer, based on dry solid weight of the mixture, iii) 5-20 wt. % of a fibrous material consisting of fibers, based on dry solid weight of the mixture, said fibers having a length of 60 to 300 μm, and iv) 7-35 wt. % of water, based on the weight of the mixture, and b) destructurizing the starch component of said mixture to form a thermoplastic starch-based material by subjecting the mixture to an extrusion step wherein the starch component is converted from an ordered structure to an unordered amorphous structure, wherein the pet chew is edible and biodegradable.

25. A process for preparing a pet chew comprising:

a) preparing a starch-based mixture from a natural starch base, said starch-based mixture comprising:

i) 50-80 wt. % of a starch component consisting of native starch or modified starch, or combinations thereof, based on dry solid weight of the mixture, ii) 18-30 wt. % of a plasticizer, based on dry solid weight of the mixture, iii) 5-20 wt. % of a fibrous material consisting of fibers, based on dry solid weight of the mixture, said fibers having a length of 60 to 300 μm, iv) 7-35 wt. % of water, based on the weight of the mixture, and v) the balance of the mixture is selected from the group consisting of an emulsifier, a filler, and combinations thereof; and b) destructurizing the starch component of said mixture to form a thermoplastic starch-based material by subjecting the mixture to an extrusion step wherein the starch component is converted from an ordered structure to an unordered amorphous structure, wherein the pet chew is edible and biodegradable.

26. A process for preparing a pet chew comprising:

a) preparing a starch-based mixture from a natural starch base, said starch-based mixture comprising:

i) 55-80 wt. % of a starch component consisting of native starch or modified starch, or combinations thereof, based on dry solid weight of the mixture, ii) 18-30 wt. % of a plasticizer, based on dry solid weight of the mixture, iii) 5-20 wt. % of a fibrous material consisting of fibers, based on dry solid weight of the mixture, said fibers having a length of 60 to 300 μm, and iv) 7-35 wt. % of water, based on the weight of the mixture, and wherein the balance of the mixture is selected from the group consisting of an emulsifier, a filler, and combinations thereof, and b) destructurizing the starch component of said mixture to form a thermoplastic starch-based material by subjecting the mixture to an extrusion step wherein the starch component is converted from an ordered structure to an unordered amorphous structure, wherein the pet chew is edible and biodegradable.

27. A pet chew obtainable by a process comprising:

a) preparing a starch-based mixture from a natural starch base, said starch-based mixture comprising:

i) 50-80 wt. % of a starch component consisting of native starch or modified starch, or combinations thereof, based on dry solid weight of the mixture, ii) 18-30 wt. % of a plasticizer, based on dry solid weight of the mixture, iii) 5-20 wt. % of a fibrous material consisting of fibers, based on dry solid weight of the mixture, said fibers having a length of 60 to 300 μm, iv) 7-35 wt. % of water, based on the weight of the mixture, and v) the balance of the mixture is selected from the group consisting of an emulsifier, a filler, and combinations thereof; and b) destructurizing the starch component of said mixture to form a thermoplastic starch-based material by subjecting the mixture to an extrusion step wherein the starch component is converted from an ordered structure to an unordered amorphous structure, wherein the pet chew is edible and biodegradable.

* * * * *